(12) United States Patent
Jessee et al.

(10) Patent No.: US 7,447,627 B2
(45) Date of Patent: Nov. 4, 2008

(54) COMPOUND WORD BREAKER AND SPELL CHECKER

(75) Inventors: Andrea Maria Jessee, Redmond, WA (US); Miriam R. Eckert, Seattle, WA (US); Kevin R. Powell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 10/804,930

(22) Filed: Mar. 19, 2004

(65) Prior Publication Data

US 2005/0091030 A1    Apr. 28, 2005

Related U.S. Application Data

(60) Provisional application No. 60/513,921, filed on Oct. 23, 2003.

(51) Int. Cl.
*G06F 17/20* (2006.01)
*G06F 17/21* (2006.01)
*G06F 17/22* (2006.01)
*G06F 17/25* (2006.01)
*G06F 17/26* (2006.01)
*G06F 17/27* (2006.01)

(52) U.S. Cl. .............. 704/10; 704/1; 704/9; 715/254; 715/255; 715/258; 715/259

(58) Field of Classification Search ............ 704/10
See application file for complete search history.

(56) References Cited

U.S. PATENT DOCUMENTS

| | | | |
|---|---|---|---|
| 4,384,329 A | 5/1983 | Rosenbaum et al. ......... 704/10 |
| 4,672,571 A * | 6/1987 | Bass et al. ................... 715/533 |
| 4,688,192 A | 8/1987 | Yoshimura et al. ............ 704/10 |
| 4,701,851 A * | 10/1987 | Bass et al. ................... 715/533 |
| 4,703,425 A | 10/1987 | Muraki .......................... 704/7 |
| 4,724,523 A | 2/1988 | Kucera ....................... 715/532 |
| 4,736,296 A | 4/1988 | Katayama et al. ............. 704/8 |

(Continued)

FOREIGN PATENT DOCUMENTS

WO    WO 99/50829    10/1999

(Continued)

OTHER PUBLICATIONS

Branco et al., A., "Tokenization of Portuguese: resolving the hard cases", Technical Report TR-2003-4, Department of Informatics, University of Lisbon, Mar. 2003.

(Continued)

*Primary Examiner*—David R. Hudspeth
*Assistant Examiner*—Justin W Rider
(74) *Attorney, Agent, or Firm*—Joseph R. Kelly; Westman, Champlin & Kelly, P.A.

(57) ABSTRACT

A method of determining the component words of a compound word is disclosed. The method identifies the component words, by comparing the word with a list of words found in a lexicon. If the word is not found in the lexicon the method proceeds to analyze the word on a character-by-character basis. After each character the method identifies any potential matches to the selected characters in the lexicon. If a match is found, it is added to a hypothesis trace in a lattice. Next, the method checks to see whether the remaining characters form a valid entry in the lexicon, and whether the entry is allowed to be a final segment.

28 Claims, 8 Drawing Sheets

U.S. PATENT DOCUMENTS

| | | | |
|---|---|---|---|
| 4,771,385 A | 9/1988 | Egami et al. | 715/532 |
| 4,868,750 A | 9/1989 | Kucera et al. | 704/8 |
| 4,887,212 A | 12/1989 | Zamora et al. | 704/8 |
| 4,969,097 A * | 11/1990 | Levin | 715/534 |
| 4,991,135 A | 2/1991 | Yoshimura et al. | 707/3 |
| 5,056,021 A | 10/1991 | Ausborn | 704/9 |
| 5,289,376 A | 2/1994 | Yokogawa | 704/10 |
| 5,611,076 A | 3/1997 | Durflinger et al. | 707/102 |
| 5,642,522 A | 6/1997 | Zaenen et al. | 715/532 |
| 5,708,829 A | 1/1998 | Kadashevich et al. | 715/531 |
| 5,715,468 A | 2/1998 | Budzinski | 704/9 |
| 5,761,688 A | 6/1998 | Morishita | 715/532 |
| 5,799,268 A | 8/1998 | Boguraev | 704/9 |
| 5,867,812 A | 2/1999 | Sassano | 704/10 |
| 5,995,922 A | 11/1999 | Penteroudakis et al. | 704/9 |
| 5,995,992 A | 11/1999 | Eckard | 708/497 |
| 6,021,409 A | 2/2000 | Burrows | 707/102 |
| 6,035,268 A * | 3/2000 | Carus et al. | 704/9 |
| 6,081,774 A | 6/2000 | De Hita et al. | 704/9 |
| 6,138,087 A | 10/2000 | Budzinski | 704/9 |
| 6,233,553 B1 * | 5/2001 | Contolini et al. | 704/220 |
| 6,278,967 B1 | 8/2001 | Akers et al. | 704/2 |
| 6,278,968 B1 | 8/2001 | Franz et al. | 704/3 |
| 6,298,321 B1 | 10/2001 | Karlov et al. | 704/10 |
| 6,393,389 B1 | 5/2002 | Chanod et al. | 704/7 |
| 6,424,983 B1 * | 7/2002 | Schabes et al. | 715/533 |
| 6,675,169 B1 | 1/2004 | Bennett et al. | 707/101 |
| 6,735,559 B1 | 5/2004 | Takazawa | 704/7 |
| 6,760,695 B1 | 7/2004 | Kuno et al. | 704/9 |
| 6,792,418 B1 | 9/2004 | Binnig et al. | 707/3 |
| 6,965,858 B2 | 11/2005 | Kempe | 704/9 |
| 2003/0187649 A1 * | 10/2003 | Logan et al. | 704/260 |
| 2003/0204392 A1 | 10/2003 | Finnigan | |
| 2005/0091031 A1 | 4/2005 | Powell | |
| 2005/0091033 A1 | 4/2005 | Valdes | |

OTHER PUBLICATIONS

Rayner et al., M., "Adapting the Core Language Engine to French and Spanish", Technical Report CRC-061, Proceedings NLP-IA, Moncton, New Brunswick, May 10, 1995.

Bleam, T., "(Non-) Parallels between Double Object Constructions and Spanish IO Clitic-doubling", Paper presented at LSRL 31, Chicago, Apr. 22, 2001.

Sánchez León, F., "Spanish tagset for the CRATER project", CRATER Internal Document, Mar. 7, 1994.

Habash, N., "Matador: A Large-Scale Spanish-English GHMT System", http://www.amtaweb.org/summit/MTSummit/FinalPapers/84-Habash-final.pdf, at least by Feb. 4, 2004.

Gõni et al., J., "A framework for lexical representation", AI95: Fifteenth International Conference. Language Engineering, Montpellier, Francia, pp. 243-252, Jun. 1995.

Marimon, M., "Integrating Shallow Linguistic Processing into a Unification-based Spanish Grammar", presented at COLING 2002: The 17th International Conference on Computational Linguistics, Aug. 29, 2002.

Palomar et al., M., "An Algorithm for Anaphora Resolution in Spanish Texts", Computational Linguistics, vol. 27, No. 4, pp. 546-567, Mar. 2001.

Bozsahin et al., H., "A Categorial Framework for Composition in Multiple Linguistic Domains", In Proceedings of the 4th International Conference on Cognitive Science of NLP, Dublin, CSNLP'95, Jul. 1995.

Giguet et al., E., "From Part of Speech Tagging to Memory-based Deep Syntactic Analysis", In Proceedings of the International Workshop on Parsing Technologies, (IWPT'97 ), pp. 77-88, MIT, Boston, Massachusetts, USA, Sep. 17-20, 1997.

Verity Internationalization "Enabling E-business in Multiple Languages" Jun. 2001.

Zweigenbaum et al., P., "Towards a Unified Medical Lexicon for French", In Studies in Health Technology and Informatics. Medical Informatics Europe; The New Navigators: from Professionals in Patients, vol. 95, pp. 415-420, 2003.

Hedlund et al., T., "Utaclir @ CLEF 2001—Effects of Compound Splitting and N-Gram Techniques", CLEF 2001 LNCS 2406, pp. 118-136, 2002.

Koehn et al., P., "Empirical Methods for Compound Splitting", EAC: 2003, 11th Conference of the European Chapter of the Association for Computational Linguistics 2003, pp. 187-194, http://www.isi.edu/~koehn/publications/compound2003.pdf.

Crabbe et al., B., "Lexical Classes for Structuring the Lexicon of a Tag", *Proceedings of the European Summer School on Logic, Language and Information 2003*, http://www.loria,fr/~crabbe/doc/lexclasses.pdf.

Chang et al., E., "Induction of Classification from Lexicon Expansion: Assigning Domain Tags to WordNet Entries", *Proceedings of the First International WordNet Conference*, pp. 155-164, Jan. 2002.

Bodik et al., P., "Formation of a Common Spatial Lexicon and its Change in a Community of Moving Agents", *Frontiers in AI:Proceedings of Scandinavian Conference on Artificial Intelligence—SCAI 2003*, http://www.cs.berkeley.edu/~bodikp/publications/scai03.pdf.

Bleam, T., "(Non-) Parallels between Double Object Constructions and Spanish IO Clitic-doubling", Paper presented at LSRL 31, Chicago, Apr. 22, 2001.

Bodik, P. and M. Takac, "Formation of a Common Spatial Lexicon and its Change in a Community of Moving Agents", *Frontiers in AI:Proceedings of Scandinavian Conference on Artificial Intelligence—SCAI 2003*, http://www.cs.berkeley.edu/~bodikp/publications/scai03.pdf.

Bozsahin et al., H., "A Categorial Framework for Composition in Multiple Linguistic Domains", In Proceedings of the 4th International Conference on Cognitive Science of NLP, Dublin, CSNLP'95, Jul. 1995.

Branco et al., A., "Tokenization of Portuguese: resolving the hard cases", Technical Report TR-2003-4, Department of Informatics, University of Lisbon, Mar. 2003.

Chang, Echa; Huang, Chu-Ren; et al. "Induction of Classification from Lexicon Expansion". *Proceedings of the First International WordNet Conference Jan. 21-25, 2002*. Central Institute of Indian Languages, 2002. pp. 155-164.

Crabbe, Benoit, "Lexical Classes for Structuring the Lexicon of a Tag", *Proceedings of the European Summer School on Logic, Language and Information 2003*, http://www.loria,fr/~crabbe/doc/lexclasses.pdf.

Giguet et al., E., "From Part of Speech Tagging to Memory-based Deep Syntatic Analysis", In Proceedings of the International Workshop on Parsing Technologies, (IWPT'97), pp. 77-88, MIT, Boston, Massachusetts, USA, Sep. 17-20, 1997.

Gõni et al., J., "A framework for lexical representation", AI95: Fifteenth International Conference. Language Engineering, Montpellier, Francia, pp. 243-252, Jun. 1995.

Habash, N., "Matador: A Large-Scale Spanish-English GHMT System", http://www.amtaweb.org/summit/MTsummit/FinalPapers/84-Habash-final.pdf, at least by Feb. 4, 2004.

Hedlund, Turid et al. "Effects of Compound Splitting and N-Gram Techniques". 2002. In Proceedings of hte Second Workshop of hte Cross-Language Evaluation Forum, *CLEF*, 2001. pp. 118-136.

Koehn, Philipp and Kevin Knight. "Empirical Methods for Compound Splitting" EACL 2003, *11th Conference of the European Chapter of the Association for Computational Linguistics 2003*, pp. 187-194. http://www.isi.edu/~koehn/publications/compound2003.pdf.

Marimon, M., "Integrating Shallow Linguistic Processing into a Unification-based Spanish Grammar", presented at COLING 2002: The 17th International Conference on Computational Linguistics, Aug. 29, 2002.

Palomar et al., M., "An Algorithm for Anaphora Resolution in Spanish Texts", Computational Linguistics, vol. 27, No. 4, pp. 546-567, Mar. 2001.

Sánchez León, F., "Spanish tagset for the CRATER project", CRATER Internal Document, Mar. 7, 1994.

Rayner et al., M., "Adapting the Core Language Engine to French and Spanish", Technical Report CRC-061, Proceedings NLP-IA, Moncton, New Brunswick, May 10, 1996.

Zweigenbbaum, Pierre, et al., "Towards a Unified a Medical Lexicon for French", In *Studies in Health Technology and Informatics. Medical Informatics Europe; The New Navigators: from Professionals to Patients*. 2003 vol. 95, pp. 415-420.

Branimir Boguraev, David Carter, Ted Briscoe, "A Multi-Purpose Interface to an On-line Dictionary", ACM 1987.

M. Nagao, et al., "An Attempt to Computerized Dictionary Data Bases", ACL 1980.

C.J. Wells, et al., : "Fast Dictionary Look-up for Contextual Word Recognition" Pattern Recognition, [Online] vol. 23, No. 5, 1990, pp. 501-508.

A. Ntoulas et al. "Use of a Morphosyntactic Lexicon as the Basis for the Implementation of the Greek Wordnet" Lecture Notes in Computer Science, 200 2000, verified on Internet.

Fredkin E.: "Trie Memory" Communications of the Association for Computing Machiner, ACM, New York, NY US, vol. 3, No. 9, Aug. 1960 (1960-68), pp. 490-499.

* cited by examiner

Nord —⟨ eng — Land
       England

FIG. 3A

Staub —— Ecken
Stau  —— Becken

FIG. 3B

COMPOUND WORD BREAKER AND SPELL CHECKER

The present application is based on and claims the benefit of U.S. provisional patent application Ser. No. 60/513,921, filed Oct. 23, 2003, the content of which is hereby incorporated by reference in its entirety.

CROSS-REFERENCE TO RELATED APPLICATIONS

Reference is hereby made to the following co-pending and commonly assigned patent applications: U.S. application Ser. No. 10/804,883, filed Mar. 19, 2004, entitled "SYSTEM AND METHOD FOR PERFORMING ANALYSIS ON WORD VARIANTS" and U.S. application Ser. No. 10/804,998, filed Mar. 19, 2004, entitled "FULL-FORM LEXICON WITH TAGGED DATA AND METHODS OF CONSTRUCTING AND USING THE SAME", both of which are incorporated by reference in their entirety.

BACKGROUND OF THE INVENTION

The present invention is directed to processing compound words when they are encountered in a textual input. More specifically, the present invention determines the component words of a compound word when the compound word is not present in a lexicon. Further the present invention provides spelling suggestions for unlexicalized compounds that are encountered.

The vocabulary of many languages such as German Dutch, Swedish, Icelandic, Norwegian, Greek, Hungarian, Turkish, and Finnish, are virtually indefinite. These languages allow for the combining of word-types recursively, and potentially without any defined limit. This process is called "compounding". Other non-compounding languages, such as English, generally build semantic units from 2 or more words either with simple blanks or hyphens (e.g. bus driver association, USA-specific). While the use of hyphens is also common in German (e.g. USA-spezifisch), it is a usual practice to compound words into one new word (e.g. "Busfahrergesellschaft").

As a result of this, it is impossible to store an entire German vocabulary in a dictionary. Therefore, in order to recognize compounded words as legitimate, a runtime compound analysis process has to be applied which can identify the lexicalized components of a compound and evaluate whether their morphological usage as a compound segment is correct.

The challenge of compound analysis is in the mapping of morphologically modified segments back to their infinitival forms or Lemmas, which are generally the forms that are stored in lexica, in order to keep these reasonably small. However, many words do not occur in their base form as a compound segment (e.g. Blumenladen→Blume, Laden (flower+shop); Hundeleine→Hund, Leine (dog+leash)). The literature typically refers to the added characters between segments as "linking elements", which are considered a kind of "morphological glue" between the compounding words. However, it is believed that this term is insufficient and misleading, since compound segments are often not resolved by the flat recognition of Lemmas and specified linking elements. In fact, the final segment of any compound always behaves like any other word in the dictionary. In other words, it may inflect according to the sentence structure or the intended semantic usage.

In German, for example, the only compound-related modification to a final segment is the capitalization: All nouns are spelled uppercase in German. Naturally, if a noun becomes a medial or final part of a larger word, its capital initial needs to be adjusted to be lowercase. Conversely, if a verb, which is always spelled lowercase, where not at the beginning of a sentences becomes the initial segment of a nominal compound, it will adjust its capitalization to uppercase. This is not considered as a morphological modification. Non-final segments show compound-specific behavior, which contains various forms of modifications to a base form, such as

- None: Busfahrergesellschaft=Bus Fahrer. Gesellschaft (bus driver association)
- Added "linker": Blumenladen=Blume Laden (flower shop)
- Shortened segment: Schwimmverein=schwimmen Verein (swimming club)
- "Morphed" segment: Länderspiel=Land Spiel (international match)
- "Special cases": Schiffahrt=Schiff Fahrt (shipping)

Analysis has shown that simple pattern matching over strings, considering only linking elements, will not resolve all kinds of compound segments. The application of all necessary modifications to a segment in order to map it back to a lexicalized form is very runtime expensive and introduces many unwanted ambiguities, the resolution of which adds to even more runtime burden.

One solution to cut down on expensive runtime processes is the shift to full form lexica, which contain all inflected forms of a word. These are typically used by commercial spell checkers. Complex morphological analysis (especially for inflected final segments) is replaced by simple lexicon lookups. This also supports the lookup of compound segments, as most of them do coincide with a legitimate inflection of a base form. However, not every lexical entry that can be found in a compound is necessarily a valid segment in the given context. This is where currently available spell checkers often fail to deal with compounds correctly. For instance, many spelling errors are not detected and spelling suggestions—if any are offered at all—are not believed to be reliable.

Compound analysis is needed for a variety of applications that involve natural language processing. Such applications include word breaking (for search engines), grammar checking, spell checking, handwriting recognition and speech recognition, machine translation, text mining, etc.

Fast and accurate compound analysis is desirable to transform documents into an index over which search queries are to be executed. It is important to identify the components of a compounded word, in order to reach maximal matching coverage. Therefore, every segment of a compound will be stored in the index and also every compounded query will be broken down to compound segments. This helps to ensure that, for example, the query "Ball" (ball) will also match with "Lederball" (leather ball) and vice versa.

Further, one issue German users have noted with spell checkers is a dissatisfying execution on compounds. Proofing tools are one of the most important technologies in the editor market. More accurate analysis of compounds is desired not only to support a more reliable and helpful spell checker, but also to enhance grammar checkers.

Word breaking and spell checking have different compound analysis requirements. While one might want to be more lenient about the correct morphological usage of segments within a compound, one needs to be able to flag wrong usage (e.g. missed or added linking elements).

SUMMARY OF THE INVENTION

The present invention performs compound analysis on input words. In a first embodiment, when a compound word is encountered, the component words that comprise the compound word can be identified. The static compound analysis module of the present invention is invoked. First, by analyzing the lexicon, the compound analysis component is able to eliminate any compound words that are already in the lexicon. If the word is not in the lexicon the present invention proceeds to analyze the compound word on a character-by-character basis. Following each character the lexicon is re-searched for entries related to the component word. If a match is made with a component word, the compound analysis checks to determine whether the identified component can be used as a component in the compound word, by checking whether the lexicon includes an indication that the word can be used as a component word.

Once a component word is identified the compound analysis module proceeds to check the remaining characters for component words. The compound analysis module may find additional component words in the remaining characters. If additional component words are found prior to reaching the last character of the compound word, the module checks to ensure that these component words can be used in non-final segments. Also, the module checks to ensure that the remaining characters are not restricted from being a final segment. This process is repeated until all characters have been analyzed and all possible component words have been identified.

Once all of the component words have been identified, the module calculates the relative probability of each segment group of the compound word. These probabilities are based upon data obtained during a statistical analysis of preexisting texts. Based on the results of the analysis, the module returns to the user or program, a most likely segmentation, or a group of segmentations along with their associated probabilities.

A second embodiment of the present invention is related to spell checking of unlexicalized compound words. These words are generally created by the user during the course of writing a document. The process executed by the compound analysis module is similar to the process used in word breaking, but the output is different.

When the compound analysis module is invoked for spell checking, the system is not concerned with the relative likelihood that a compound is correct, but whether it is a possible and probable compound. First the analysis module checks the word against the lexicon. If found in the lexicon, nothing further happens. If however, the word is not in the lexicon, the analysis module proceeds to break the word into component words. When a component is matched with a word in the lexicon, the analysis module checks to see whether the word in its present form is allowable in a compound. If it is not allowable in a compound, the module checks the next character against the allowable variations of the identified word for use in a compound. If an allowable word is found, the module accepts the word and proceeds. However, if the next character is not a valid entry in the lexicon, the module will then identify the variations of allowable segments as possible suggestions. The module then performs a statistical analysis and attempts to determine which of the variations is most likely the correct variation for use in this compound word. The best answer is output to the user as a spelling suggestion.

The static compound analysis of the present invention provides a significant improvement in the capabilities of word breakers and spell checkers when encountering compound words. Through the use of a full form lexicon that is annotated to include variations of words as they occur in compounds, the compound analysis module is able to identify compound words that are not lexicalized in the lexicon.

BRIEF DESCRIPTION OF THE DRAWINGS

FIGS. 3A and 3B are one embodiment of diagrammatic representations of lattices generated by the decoder.

DETAILED DESCRIPTION OF ILLUSTRATIVE EMBODIMENTS

Figure 1:
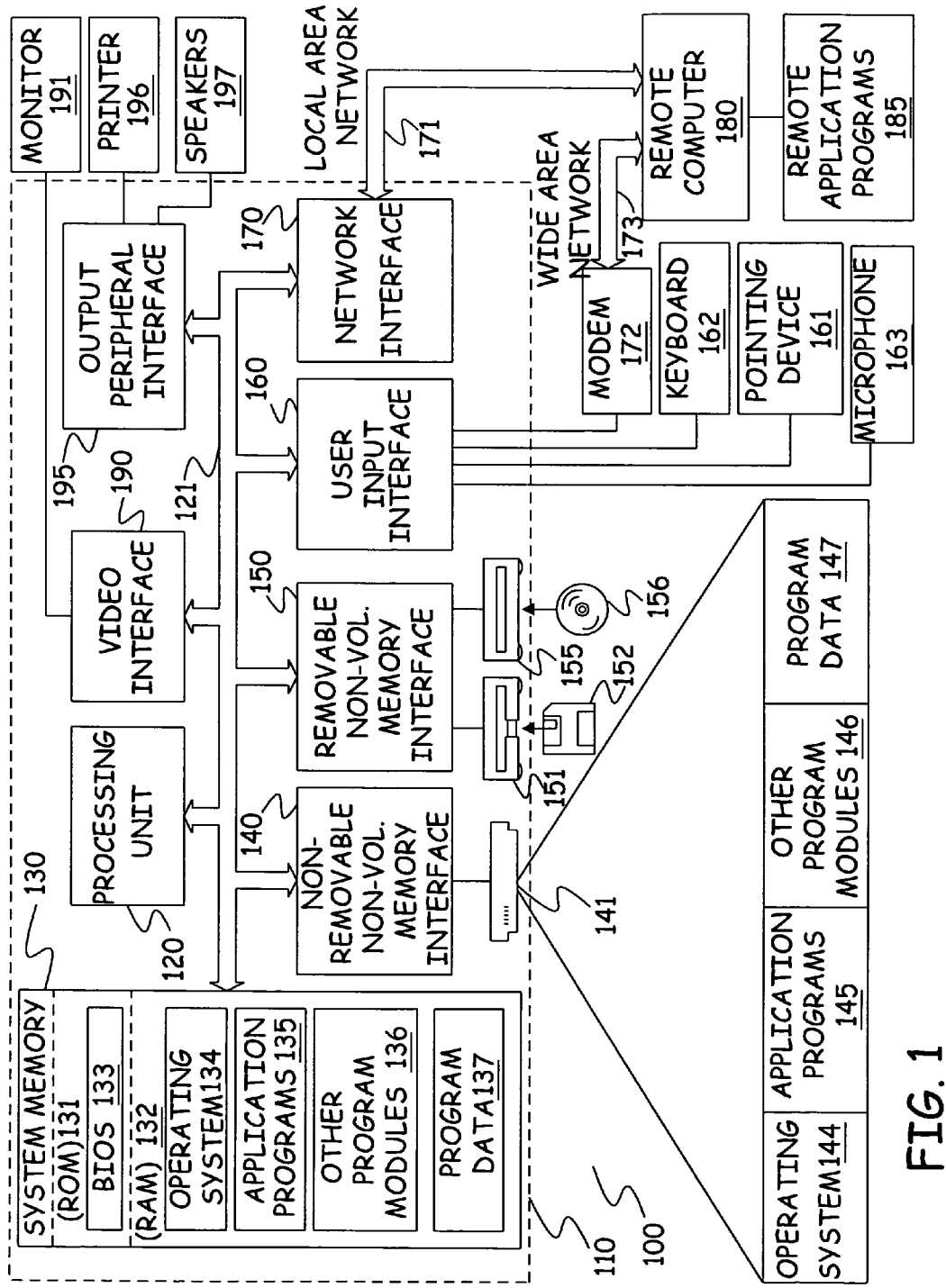
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS)., containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
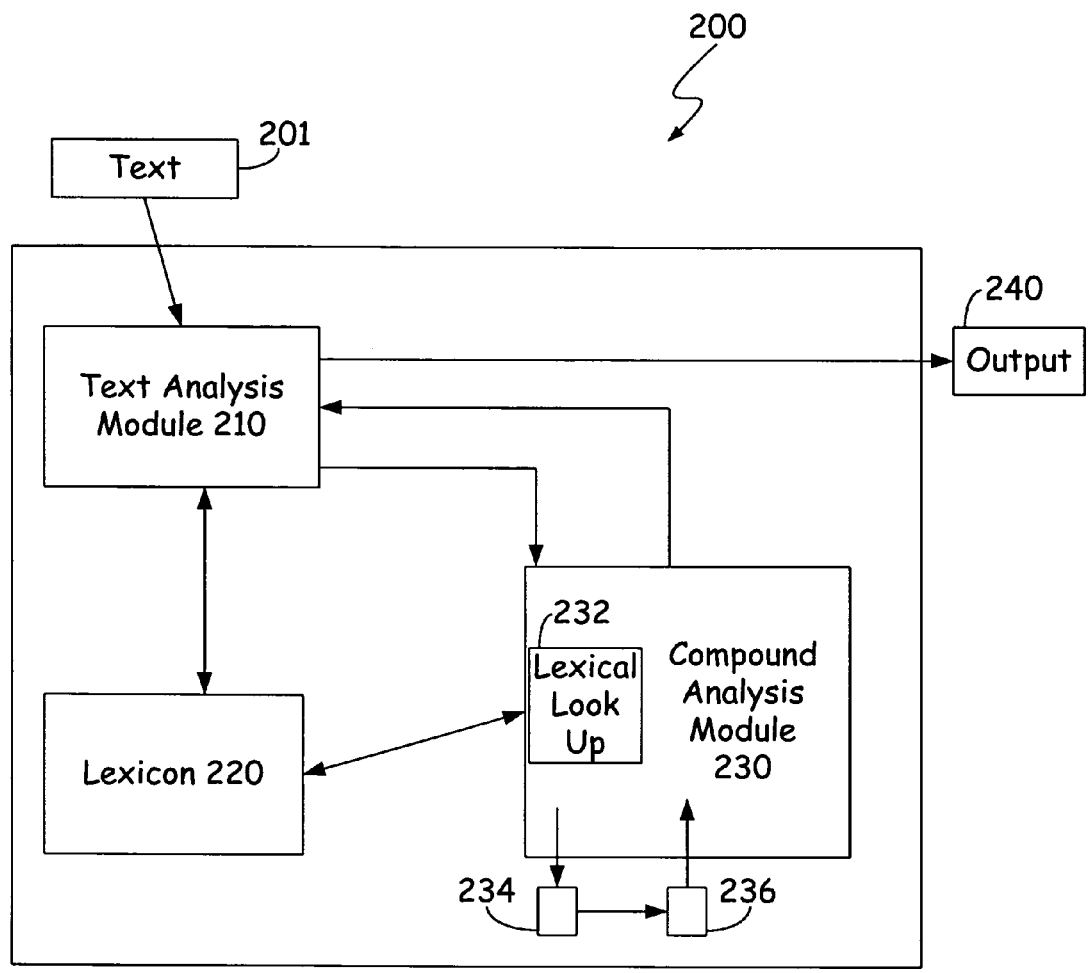
FIG. 2 is a block diagram illustrating one embodiment of the components of the present invention used to identify the component words of a compound word.

FIG. 2 is a block diagram illustrating the components of the present invention used to identify the component words of a compound word. Component word analysis module 200 includes a text analysis module 210, a lexicon 220, and a compound analysis module 230. Text analysis module 210 receives a textual input 201. This textual input can be any kind of textual input that is to be analyzed for compound words, such as a document or a search query. The text analysis module 210 is configured to identify each word in the textual input 201. The identified words are compared to words that are stored in lexicon 220. If a word is not found in the lexicon 220, the word is passed to the compound analysis module 230.

The compound analysis module 230 determines the component words of the compound word, and in one embodiment returns the component words to the text analysis module 210. In another embodiment, the compound analysis module 230 returns spelling suggestions for the compound word to the text analysis module 210, if the compound was misspelled. Otherwise, the module 210 accepts the unlexicalized compound as valid word. These results are then output as output 240. Once again depending on the use of the component word analysis module 200, the output 240 can vary. For example, output 240 can be to a word processor, to a search engine, etc. A more detailed description of the function of compound analysis module 230 is provided below.

The challenge of compound analysis lies in the identification of compound or component segments, which may or may not have undergone morphological adjustments in order to become a valid part of the compounded word. Typically, the process of compounding is described as the combination of words, often with the use of linking elements and/or the use of "umlauts". The term "umlauting" will be used herein to describe the changes such as "a" to "ä", "o" to "ö", "u" to "ü", or "o" to "ø". As explained early, sometimes words are shortened when used in a compound and this is also considered.

The dynamic (runtime) compound analysis module 230 of the present invention considers all possible modifications in order to restore a word that can be mapped to a lexicalized form, which often introduces a large lattice of possibilities requiring additional ranking. With some very regular exceptions, every valid compound segment coincides with one or more valid inflectional form(s) of a word. Prior art Systems that make use of fully inflected word-lists already benefit from many successful matches because of that. However, they often map compound segments to lexicalized forms that cannot occur as a segment. For example, if the textual input "Blumeladen" ("flower shop" in German) is entered for the compound of the words Blume and Laden, prior systems would not recognize that the word is in error, and that the correct compound is Blumenladen.

"Blume" is the nominative singular, or its own base form. However, it never occurs in a compound that way. The correct usage always requires the linking element "n". Or in terms of the present invention, it always occurs as its plural form in a compound (Blumen is the plural of Blume). If someone mistypes the compound as illustrated above, the misspelling usually goes unnoticed by a spell checker, since the unfound word "Blumeladen" can easily be resolved into the lexicalized elements "Blume" and "Laden", and thus be considered a compound.

A further problem with such prior art systems is that they cannot account for compounds whose segments are not valid inflections of a word, e.g. Änderungsschneiderei (modification tailoring) (Änderungs is not a valid form of Änderung). Systems that dynamically allow the insertion of linking elements might correctly analyze Änderungsschneiderei but there is no guarantee that they are allowing the correct linking element in each context.

Predicting the correct linking element for lexical entries is notoriously difficult and any attempts at writing rules for this based on phonological context, gender, word origin etc. are generally rendered useless by the large numbers of exceptions. This means that systems relying on such "rules" inevitably lack in either precision or recall. For example, they may allow incorrect linking elements (e.g. *Zeitungepapier->Zeitung+e+papier) (newsprint) or disallow correct linking elements (e.g. Länderkammer (correct)->Land+s+kammer (incorrect), but->Land+s+mann (correct)).

One advantage of compound analysis according to the present invention is that it recognizes both compound segments that are inflected forms of a word as well those that are not inflected forms (e.g. Änderungs), but does so based on what has actually been seen during the corpus search rather than on imprecise linker rules.

The lexicon 220 used for static compound analysis, in one embodiment of the present invention, includes a full form lexicon. The full form lexicon includes a fully inflected wordlist, annotations of valid non-final compound segments, additional segments that do not coincide with regular inflectional forms (these segments are marked as "restricted segments" (seg1) which is discussed in further detail below), and marking of words which shall not be considered compound segments (anti-seg).

Anti-segs may not be considered as compound segments for one of a number of different reasons. It may be because they often occur as part of a non-compounded word (e.g.: "ion" (chemical element) vs. Nation. If someone misspelled "Nation" with "Nahion", it is not desireable to resolve it to "nah" (=near)+"ion"), or because they generally don't compound. For instance, such segments include most inflections of "sein" (to be), such as "ist" (is), "sind" (are) "war" (was), etc.

The full form lexicon may also include general heuristics for capitalization regulations. Such heuristics may implement regulations such as every medial or final element must always be spelled lowercase, word-initial segments need to comply with the sentence position and the part of speech of the final segments (which determines the part of speech of the entire compound and if it is a noun, then the entire compound needs to begin with a capital letter, even if the word-initial segment was a verb).

One feature of lexicon 220 is the annotation of valid non-final compound segments. These annotations are generated, in one embodiment, using a fully dynamic compound analysis (DCA) process the root of which is used at runtime and implemented by the grammar checker, such as the grammar checker developed by Microsoft Corporation of Redmond, Wash. However other compound analysis processes may be used. The DCA is illustratively run over large corpora, and returns dynamically calculated compound segments using complex and time consuming morphological analysis and ranking mechanisms. The DCA identifies compound segments using a reversed application of segment modifications in order to resolve them to their base form, since a (richly annotated) base form lexicon is what typical systems usually work with.

A mapping algorithm attempts to map back the results to the original string, thus increasing the accuracy of the returned segments by weeding out every failed mapping. The output routine for the successfully mapped segments then attaches information to each surface segment (i.e. the segment as it occurs in the compound) whether it has been found in word-initial/word-medial (seg1), or word-final position (which does not need specific marking, since most words of certain parts of speech can also occur as a final segment).

The compounding rules for the non-final segments are basically the same. However, the word-initial segment illustratively obeys certain capitalization rules (as discussed above). Since this is strictly context-dependent, a separate annotation for word-initial and word-medial segments in the lexicon is not only redundant, but has an adverse effect on coverage of the lexicon.

Following the mapping, all annotations are transferred into the fully inflected wordlist (or full form lexicon 220). If a lexical entry never occurred as a non-final compound segment during the corpora "harvesting", it will not be marked as a valid seg1 segment.

Every entry with the part of speech noun, verb, adjective, or adverb is considered a potentially valid final segment, unless it has been specifically marked as an invalid compound segment. For example, the full form lexicon representation of "Blume" (with respect to compounding) looks as follows:
 Blume
 Blumen—seg1

The "seg1" indication is a bit added to the entry that indicates that this entry is a valid entry in a compound. It also indicates that capitalization may be ignored for medial and final segments and determined for initial segments according to their context.

The representation of the inflections of an entry like "Land" illustratively appears as:
 Land—seg1 (Landwirtschaft) (farming, agriculture)
 Landes—seg1 (Landeskammer) (Local legislature)
 Lands—seg1 (Landsmann) (fellow countryman)
 Länder—seg1 (Länderspiel) (game between two international teams)
 Ländern All entries marked with "seg1" are illustratively accepted as a non-final segment, which means that everything else, though present in the lexicon, will either be excluded or accepted with penalty. When accepted with penalty a spelling suggestion can be made as is discussed later.

This approach allows any combination of "seg1" and final segment, e.g. Landkammer, Länderwirtschaft, etc. However, the correct versions of these compounds (Landeskammer, Landwirtschaft) are very common and should therefore be lexicalized as whole compounds in the lexicon 220. Thus resulting in a preferential ranking of these compounds during analysis.

Some compound segments occur with a separate linking character "s", which is not part of any valid inflection of the word. Typically, this is true for every word ending in "ung" (a derivation used to nominalize verbs, similar to the English "ing"). Thus, there is no valid inflection that would allow an "s" at the end of an "ung"-word. However the "s" is mandatory for such a word to be used in a compound for example:
 Bedeutungstragend→Bedeutung+s+tragend, (meaning+carrying)
 Verheissungsvoll→Verheissung+s+voll (promise+full)

Valid Inflections of the word "Bedeutung" are:
 Bedeutung
 Bedeutungen

It should be noted that all words ending in "ung" inflect the same way.

In order to be able to map these forms to lexicon 220 in the same way as other segments are to their marked inflections, additional forms are added to the lexicon 220 that are only correct in the context of a compound, e.g. "Bedeutungs", "Verheissungs", etc. Therefore, the representation in the lexicon 220 for Bedeutung is as follows:
 Bedeutung
 Bedeutungen
 Bedeutungs—seg1

The seg1-information allows the system to recognize the corresponding entry as a valid compound segment just like the segments that coincided with valid inflectional forms already in the lexicon. It is necessary to ensure, though, that these incorrect entries can still be identified as wrong stand-alone forms by the spell checker. To achieve this the present invention utilizes spell-checking-related information already encoded. Like many other languages, German has different dialects (e.g. Swiss, and Austrian) and words may either be valid in one, some, or all of the dialects. An entry like "Bedeutungs" is not a valid stand-alone word in any dialect and therefore does not have any dialect-marking. The lack of a dialect marker or bit is the information that the system uses to identify an entry as incorrect, and therefore able to flag it as a misspelled word if encountered in user input.

Verbs can also be used in compound words. When verbal non-final segments are shorter in the compound than in their infinitival form there is no need for any special treatment, as the shorter variants also correspond to existing inflectional verb forms. Usually, the corresponding inflection is the no-schwa first person singular (or the imperative, which is the same for regular verbs).

For example, "schwimmen" (to swim), the verb, has a no-schwa first person singular and imperative of "schwimm" where the imperative is also indicated in the lexicon 220 as being an allowed non-final segment, and thus includes a "seg1" bit.

The final category of entries that should be considered are compounds in which a letter is omitted in order to avoid tripling (for example Schiff+Fahrt−>Schiffahrt). Three repetitions of the same letter was forbidden according to old spelling conventions. Recently, approximately 8 years ago, a spelling reform came into effect that now allows three consecutive identical letters. Since the spelling reform is still very young and especially as not all persons choose to abide by the new spelling conventions, it is necessary to provide for different spelling variations that may be encountered. For example: under the old spelling rules the combination of Nordsee+Expedition becomes Nordseexpedition (old sp.) and under the new spelling becomes Nordseeexpedition (new sp.))

In order to be able to separate the compound "Nordseexpedition" into "Nordsee" and "Expedition", an additional "e" needs to be added to the word. In one embodiment, this addition is not dealt with in the lexicon 220, but in a lexical lookup tool 232 in the analysis module 230 which compares each character of an input string with each of the lexical entries (left to right). In the case of a mapping failure (e.g. an unlexicalized compound), the system will switch to "compound mode" and the mapper will be able to find "Nordsee", but will not be able to map "xpedition" to any existing word. Since the system is in compound mode, it can use the general information that confirmed segments with double letters at the end might share one of their letters with the next segment, and take this into consideration at runtime. If in speller mode, this may or may not be indicated by a "red squiggle" or other indication, depending on whether the spell check system has been set to pre-spelling reform or post-spelling reform. In the context of word breaking, it simply enables the system to return the correct segments.

In rare cases when the mapper is able to find a valid lexical entry in spite of a missing character, two segmentations are emitted and a statistical language model can be used to rank their respective probabilities.

For example: Nordseegel can be broken into a compound of Nordsee+Egel of Nordsee+Gel. These two hypotheses of the component words are ranked according to their statistical probabilities.

This is not the only context which might return different variations of possible segmentations. While the amount of segment ambiguity is significantly less than what is encountered with the application of dynamic linking logic, some cases are still possible. For example, the word "Nordengland" can segment into Nord+eng+land (northern+tight+country) or can segment into Nord+England (northern+England) and Staubecken can segment into Staub+Ecken (dust+corners) or Stau+Becken (water reservoir near a dam).

While the former kind of ambiguity may be handled by simple "longest segment" heuristics, the second example cannot be disambiguated that way. Therefore, the output of the static compound analysis goes into a decoder 234, which is basically a segment lattice as illustrated in FIGS. 3A and 3B for the above examples of dual segmentation.

A statistical language model 236 then uses frequency information gathered during the aforementioned compound segment harvesting in order to assign probabilities to the different paths through the lattice generated by the decoder. If the client requires only one result to be emitted, this assists in selecting the most probable one. If more than one result is desired, the statistical language model 236 ranks the generated lattices.

When the system is spell checking, the ambiguity does not require resolution, because the system only needs to confirm a correct segmentation. This is true unless the compound is subject to a spelling-reform related ambiguity, which, in the case of "Nordseegel" (North Sea+leech or North Sea+gel) the statistical language model 236 illustratively considers the frequency of "Gel" as a final segment versus "Egel" (or if bigrams are being evaluated, the frequency of "Gel" next to "Nordsee" or "See" versus "Egel" in the same context). A strong difference in probability determines whether the spell checker should suggest an extra "e" for "Nordsee"+"Egel".

Compound segments are gathered, in one embodiment, by data harvesting a large corpora. During the data harvesting frequency information related to each word's position within a compound is collected. This information is used in different degrees of granularity depending on the needs of the system. This granularity can include simply considering context-free unigram information, such as: "how often does a lexical entry appear as a segment?" It can also include considering context-sensitive unigram information, such as: "how often does a lexical entry appear as initial/medial/final segment?" The data harvesting also obtains information by considering bi-gram information, such as: "how often does segment x occur next to segment y?" and also by considering category bi-gram information, such as: "how often does segment x occur next to a certain part of speech?"

The approach taken by one embodiment of the present invention in the statistical language model 236 uses bigram information. To avoid issues of data sparsity it counts lemma frequencies rather than frequencies of surface strings. For non-final segments, counting lemma frequencies rather than surface strings makes little difference, as for each lemma there are usually only one, maybe two, inflectional forms that are allowed in a compound. For final segments, however, this approach greatly increases the count, and highlights that the exact form of the head (final) segment is of little importance. For example, if the system calculates the probability of the co-occurrence of Staub+Ecke (P(Ecke|Staub)) (dust+corner). The system can assume that this probability can also be used for the bigram Staub+Ecken (P(Ecken|Staub)) (dust+corners).

Figure 4:
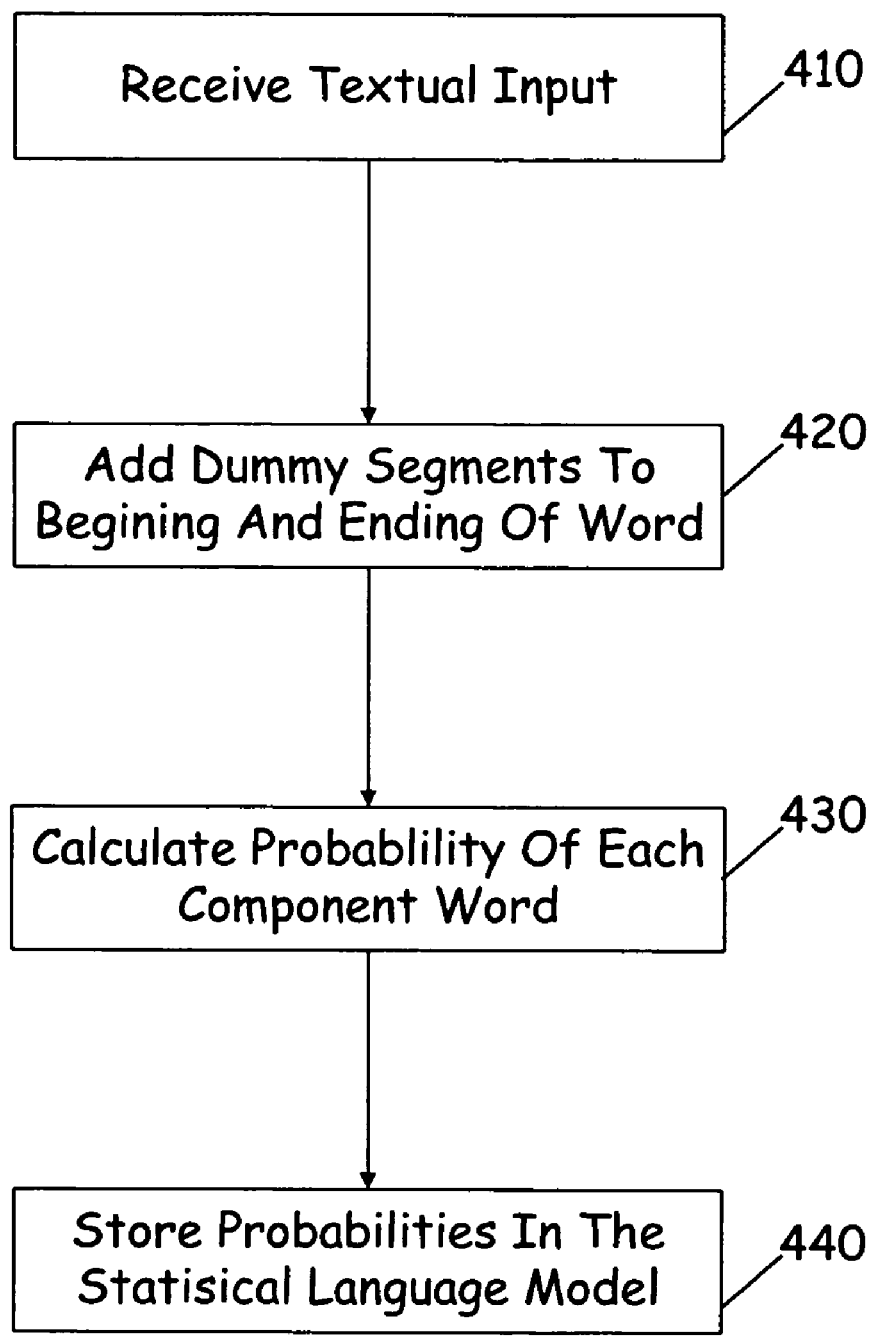
FIG. 4 is a flow diagram illustrating one embodiment of the steps executed when the statistical language model is accessed.

FIG. 4 is a flow diagram illustrating the steps executed when the statistical language model 236 is accessed. A compound word is received by the statistical language model at step 410. Segments at the beginning and end of compounds do not have segments on both sides which is a requirement for a bigram model. Thus, the statistical language model 236 uses WB (word beginning) and WE (word end) dummy segments where needed. These segments are added at step 420. These dummy segments are useful for another reason, which is that intuitively it is assumed that final segments behave similarly in terms of where and how often they occur. It seems likely that some lexical entries may be better modifying segments whilst others are better head words. Using the "WE" segment when calculating bigrams allows the statistical language model to not only calculate the probability of, for example, Staub given Ecke (P(Ecke|Staub)) but also the probability of word end (WE) given Ecke (P(WE|Ecke))—i.e. how likely is Ecke to occur as the lemma of the head segment of a compound.

The addition of WB and WE is important for another reason, namely that it allows the statistical language model 236 to indirectly factor in the unigram frequencies of lexical entries using the probabilities of (lexical_entry|WB) and (WE|lexical_entry) bigrams. This is important because the statistical significance of a bigram probability depends on how frequently the two lexical entries occurred overall in the corpus. The calculation of the probability of the occurrence of each component of the compound is illustrated at step 430. These probabilities are stored in a database within the statistical language model 236 at step 440.

The advantage of using bigrams is that it is possible to obtain a more "intelligent" assessment of the probabilities. Bigrams allow for the tapping of semantic information to a certain degree. For exmple, the compound Nordseegel is ambiguous between Nordsee+Gel (northsee gel) and Nordsee+Egel (northsee leech). In many corpora gel is more frequent than leech and a unigram model favors the unlikely northsee gel interpretation. In the context of Northsee, however, leech is more likely than gel and a bigram model correctly reflects this.

The disadvantage of bigram models is potential data sparsity because bigrams are inherently less frequent than unigrams. It is expected that the system will encounter compound analyses with no available bigram information because the individual segments simply did not co-occur in the training corpus. In these cases the system can "back-off" to a more general category and use bigrams of part-of-speech rather than lemmas.

The multiplication of the segment bigram probabilities means that analyses with less compound segments are favored over analyses with more—a highly desirable consequence. The segmentations are then ranked according to their probabilities. Client requirements can be used to determine whether all or just the top one or top n get emitted when the analysis module 230 is called.

Figure 5:
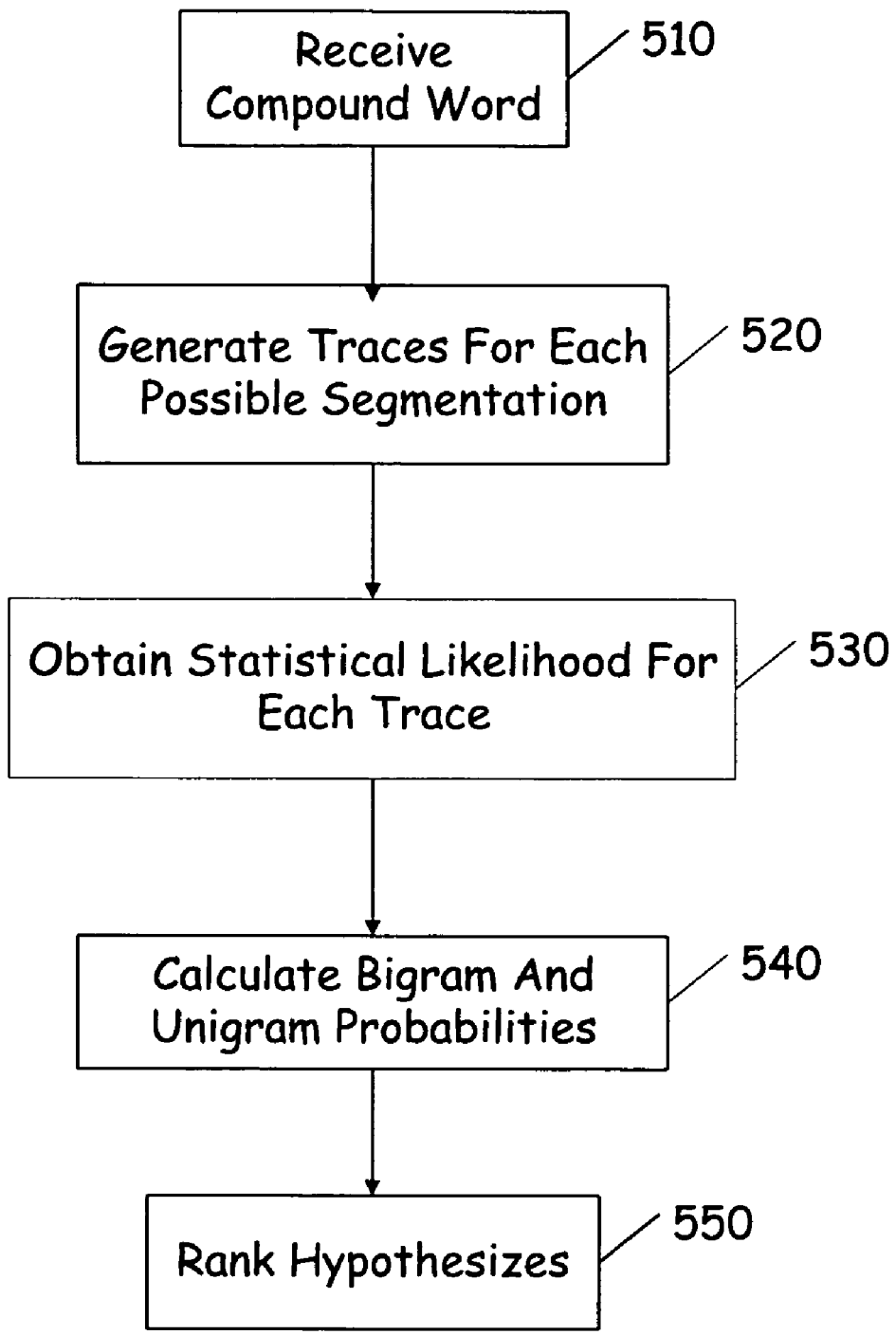
FIG. 5 is a flow diagram illustrating one embodiment of the process when compound word is encountered.

FIG. 5 is a flow diagram illustrating the process followed in one embodiment of the present invention when a compound word is encountered. The system receives the compound word at step 510. All encountered interpretations are entered as traces into the lattice in decoder 234. These traces are generated at step 520. The database of statistical unigram and bigram information is accessed for each trace at 530. For example, if the compound is "Staubecken" the system will calculate the probabilities including unigram and bigram probabilities for all segmentations at step 540.

Based on the calculated probabilities the interpretations are ranked and suggested in the most probable order at step 550. This ranking is predominantly significant for the word breaking context where the actual segments need to be returned. For spell checking, the ranking is generally less important, as it is desirable to prove that some valid segmentation could be identified in a non-lexicalized compound, not necessarily which one. However, it becomes very important if used to decide for or against a compound-interpretation versus a spelling error. For example, assume the word "Superowl" is encountered. The system determines if the intended word is a misspelling of "Superbowl" or a compound "Super owl". To achieve this the system determines the likelihood of the compound "Super+owl".

In one embodiment, the lexicon 220 includes 75,000 distinct compounds. For the purpose of spell checking, these lexicalized compounds make successful look-ups more reliable, because the word-breaker and the spell-checker generally prefer lexicalized compounds over ones constructed by the compound analysis. A correctly spelled lexicalized compound can immediately be identified, and also a slightly misspelled lexicalized compound can easily be corrected and be offered as a top ranked correction. Generally, the most frequent German compounds will be lexicalized, ensuring that they always take the top position in a suggested ranking.

However, the present invention does not exclude the possibility that writing a different (non-lexicalized) compound might have been the true intention of the author. Depending on the penalty assigned by the spelling correction algorithm, the system may additionally call for a static compound analysis. In some cases the system might find a combination which does not require spelling correction.

For example the correctly spelled word "Hundetuch" (dog cloth/scarf/bandana) might be considered a misspelled version of "Handtuch" (towel). However, this assumption would require two corrections (u→a, e→Ø) to the word. Statistical information regarding the segments assist the spell checker in weighing the likelihood of the input being a compound against the likelihood of it being a misspelled lexical entry.

Figure 8:
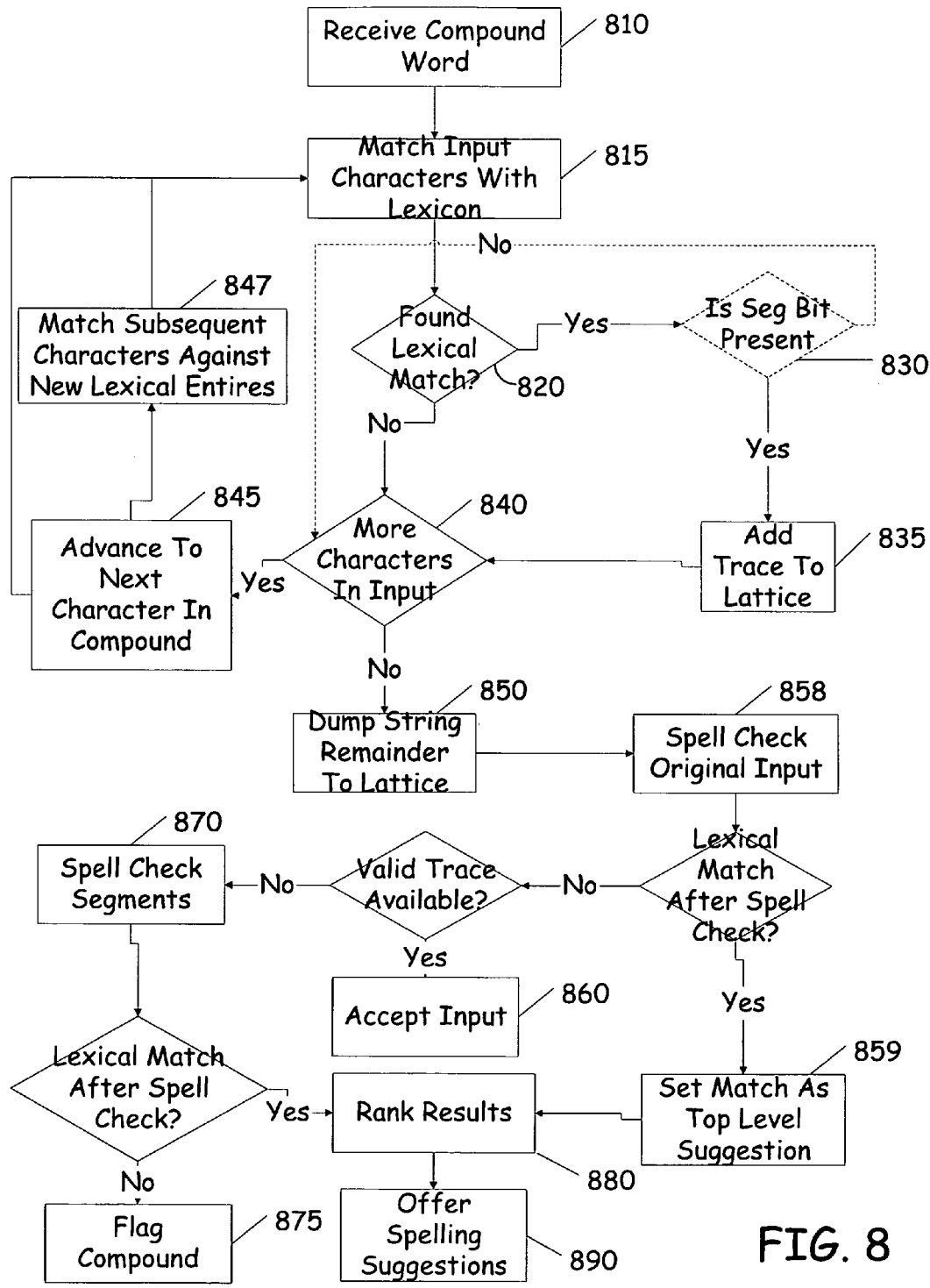
FIG. 8 is a flow diagram illustrating one embodiment of the steps executed when a compound word is misspelled.

In the above example, the high "edit distance" resulting from the two corrections will most likely lose against the correct compound. However, if the system were presented with the word "Hundtuch" it is possible to arrive at a lexical match (with or without compound analysis) with at least one spelling correction (either a→u for the lexicalized "Handtuch" or Ø→e for the correct compounded form). Depending on the statistical likelihood of the compound and other programming features, the system can decide to offer "Hundetuch" as a possible spelling correction, but if it does, it is illustratively ranked lower than the lexicalized word "Handtuch". An example of the steps executed by the static compound analysis module when a mispelled compound is encountered is illustrated at FIG. 8.

Figure 6:
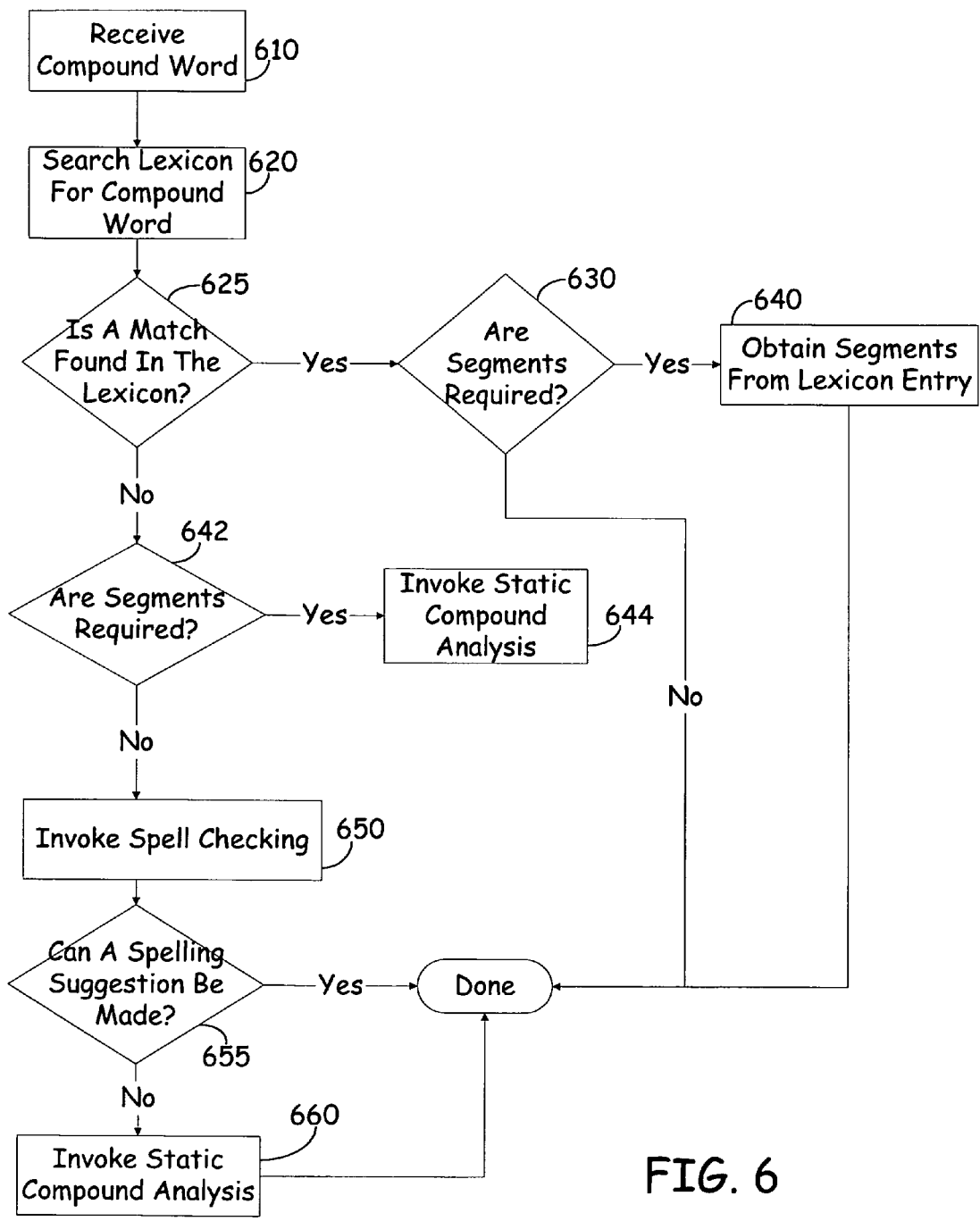
FIG. 6 is a flow diagram illustrating one embodiment of the invocation of static compound analysis.

FIG. 6 is a flow diagram illustrating the invocation of static compound analysis in module 230 for both spell checking and word breaking scenarios. A compound word is received at 610. A match between the compound word and the full form lexicon is attempted at step 620. If the compound word is found in the lexicon as a lexicalized compound, the match will succeed at 625, and then the context of the invocation of either spell check or work breaking is determined. It can then be determined whether it is needed to split the lexicalized compounds into its segments or not at step 630 (yes for word breaking, no for spell checking). In the wordbreaking scenario, the static compound analysis (SCA) or other process is invoked at step 640 in order to obtain the segmentation information that has been provided for the lexicalized compounds.

If the compound was not matched with the full form lexicon at step 620 and 625, the system determines if segments are needed, at step 642. If segments are needed static compound analysis is invoked at step 644. If the system is in spell check mode the spell checker is invoked at step 650. Spell checking at this step can be done according to any method of spell checking or can be done according to the teachings of the present invention. If no spelling suggestion can be offered at step 655, the static compound analysis module 230 is called at step 660.

When static compound analysis is called for spell checking the static compound analysis module 230 is not used to provide segmentation information, but to identify all partial licensed matches, such as those segments that may be used in a compound word. It also uses its language model to suggest the best segmentation (e.g. most probable), if more than one correct interpretation is possible, to generate a spelling suggestion.

Figure 7:
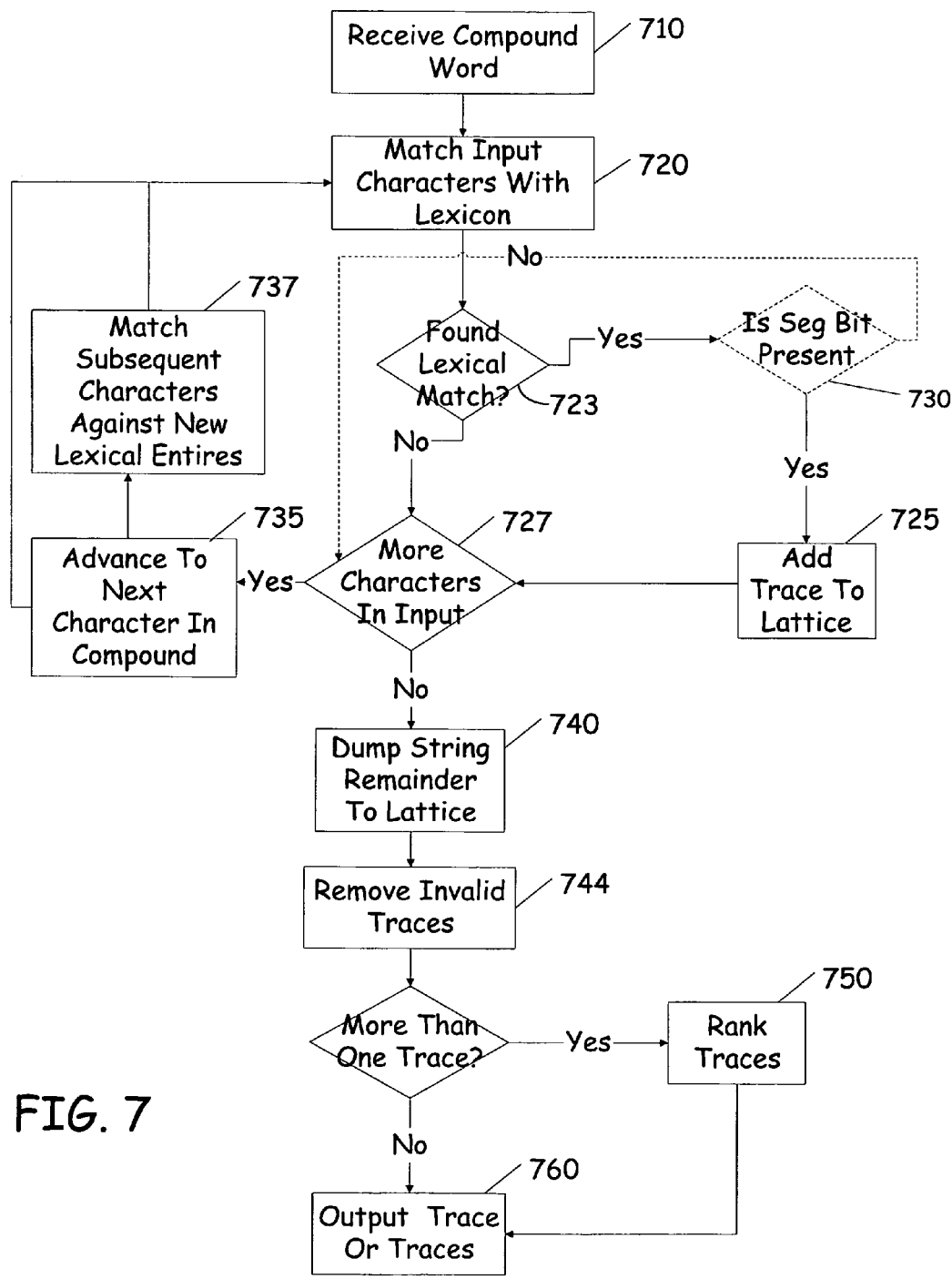
FIG. 7 is a flow diagram illustrating one embodiment of the steps executed for word breaking.

FIG. 7 is a flow diagram illustrating the steps executed when the static compound analysis module 236 is invoked for word breaking at step 644 of FIG. 6. For purposes of this discussion it is assumed that the textual input of "Hundeleine" is received at step 710. The input of "Hundeleine" means dog leash in German. The input is read character-by-character and matched incrementally with entries in full form lexicon at step 720. The first entry in the full form lexicon that the system identifies at step 720 is "Hund". A match in the lexicon is identified at step 723. This entry is added to the lattice 725. In one alternative embodiment, the system then checks to determine whether the matched entry has the "seg1" bit at step 730, which is illustrated in phantom in FIG. 7. As the entry does not have the "seg1" bit it cannot be a component portion of a compound word, thus the trace started with "Hund" will not be considered valid. The system identifies that there are additional characters in the input at step 727.

Therefore the first portion is incremented to "Hunde" at step 735 by incrementing to the next character in the compound word. The system then finds a successful lexical match at step 720 and 730. Again, this match will be added to the lattice at step 730, this time beginning a potentially valid path, as "Hunde" does have the "seg1" bit.

Parallel to the matching of the longer string "Hund+e", the system also allows for new segments to begin, as illustrated at step 737. This method of parallel matching allows for the generation of multiple traces through the word at one time. However, in alternative embodiments of the present invention each potential trace through the compound word can be done individually and not in parallel.

The system continues to map the remaining character string or portion ("leine") to full form lexicon entries, creating possibly several valid as well as invalid traces in the lattice by representing the process above. As a word-internal string is always uncapitalized or sentence-initial strings are always capitalized, any capitalization in the lexicon is ignored for purposes of matching.

The system then checks to determine whether there are characters remaining after matching an entry at step 727. If the remainder matches a lexicon entry, it will be entered into the lattice at step 725. Step 740 indicates the end of the input string has been reached. The system checks to determine whether the entry includes the "seg2" bit or "anti-seg" bit, which prohibits the word as a final segment at step 744. If the entry includes the "anti-seg" bit, it will not be considered as a valid compound segment, but merely as some unannotated string. As a result the corresponding trace cannot be resolved as part of a valid compound. ( While traversing the input string in one embodiment, all possible segmentations are added as competing traces to the lattice as they are matched to the lexicon. Based on these generated traces, the system calculates the probability that any one segmentation is correct according to the process outlined in FIG. 5 above. However, other process may be used. Depending on the arrangement of the system, the most likely candidate or a set of candidates, is returned at step 750. In this case the segments "Hunde" and "Leine" are returned at step 760. Later processing may convert "Hunde" to "Hund", "Hunden" or "Hundes" depending on the needs of the user.

FIG. 8 is a flow diagram illustrating the steps executed when a compound word is misspelled. For purposes of this discussion, it is assumed that the input compound word is "Hundleine" and is received at step 810. In the above input the compound is misspelling. This error can be interpreted as an omission of the linking "e" or a misspelling (in the context of a compound) of the first segment "Hund" instead of "Hunde". It is important to note that while "Hund" is a perfectly correct stand-alone entry, it may not appear as such in a compound segment even though it matched an entry at step 815.

The system identifies a lexical match at step 820. The system does not consider the match with the corresponding full form lexicon entry as valid, because the entry lacks the required "seg1" bit for a component word used in a compound. However, this evaluation takes place after all hypotheses have been added to a lattice at step 835, therefore the currently matched entry "Hund" will be added regardless of the missing "seg1" information. In alternative embodiments the lattices are generated only when the "seg1" bit is present in the component word. In one alternative embodiment, the system then checks to determine whether the matched entry has the "seg1" bit at step 730, which is illustrated in phantom in FIG. 7. The system identifies that there are additional characters in the input at step 727. Next the system increments to the next character at step 845, and determines whether incrementing to the next character "l" (i.e. Hundl) generates a valid entry in the lexicon at step 815. In parallel, the system attempts to match the remaining string portion of the input against a new lexical entry in order to identify possible compound segment candidates at step 847. However, in alternative embodiments of the present invention each potential trace through the compound word can be done individually and not in parallel.

Eventually, the remaining string "leine" will be matched against "Leine" in the lexicon, and added to the lattice trace as a valid compound segment. Step 850 indicates that the end of the input string has been reached. Since this trace (containing "Hund" and "Leine") does not constitute a valid compound, as "Hund" does not have a "seg1" marker, the system tries to find licensed variants of "Hund", such as those inflectional variants which have the "seg1" bit ("Hunde", "Hunds").

In order not to create "masking" problems caused by unlikely compound-interpretations for actual spelling errors (as demonstrated in the "Superowl" example), the original input is first checked for a possible low-cost spelling error at step 858. If a lexical match with the entire input is found at step 858, the match is assigned a very high probability for the suggestions ranking of step 859. This allows for further compound-related suggestions that would be ranked lower.

If there was no lexical match after spell checking, and if at least one valid compound-segment trace is in the lattice, the system will stop at step 860. Otherwise, the segments which violate the validity of the trace (here: "Hund" w/o "seg1") will be further spell-checked at step 870.

In one embodiment the system uses simple spelling-transitions. However, the system can additionally make use of a "Lemma" feature which relates all inflected forms of a base form (lemma) to each other for higher accuracy. Every entry contains encoded information that can be evaluated to retrieve its lemma. The lemma contains information regarding all of its inflectional variants. This is how variants of "Hund" can be identified in the lexicon as alternate variations of the first component word.

If the attempt to find an inflectional variant fails, and matches could only be found with high-penalty speller transitions, the system will refrain from offering any suggestions and merely flag the compound as having a spelling error at step 827. If there were lexical matches found after spell checking the system accesses the language model and determines the probability of the identified possible compound segment at step 880. The system identifies "Hunde" as a common compound segment and offers "Hundeleine"(as a concatenation of the successful full form lexicon matches of "Hunde" and "Leine") as the top suggestion for the spell checker at step 890. If these are lexical matches after spell checking, and generated compound matches the system ranks these results together with the lexicalized compound ranked highest.

It should also be noted, of course, that, applying the speller transition rules to find inflectional variance of the component words can be limited. For instance, it may be that the rules are only applied so that they add no more than two additional characters to the component word being varied. Similarly, the spelling suggestions offered at block 890 may exclude any suggestions where the speller transition rules added, removed, or changed more than two characters in the word being varied. Also, at block 890, the spelling suggestions may preclude those where more than two component words in the compound word required the application of speller transition rules. Other limitations can be used as well, of course.

What is claimed is:

1. A method for identifying at least two component words in a compound word, comprising:
   receiving the compound word;
   searching a lexicon for the compound word, the lexicon including word entries that are annotated with associated segmentation information indicative of whether the associated word can form a component of a compound word; and
   identifying the component words for the compound word based on the entries contained in the lexicon including the annotated word entries by matching a first word portion of the compound word with a first entry in the lexicon, and matching a second word portion of the compound word with a second entry in the lexicon
   wherein matching the first word portion further comprises:
      searching the lexicon for a word entry that matches the first word portion;
      if a match is found;
         analyzing the second word portion for matches with word entries in the lexicon;
         if a match is found for the second word portion;
         generating a hypotheses and adding the hypothesis to a list of hypotheses, wherein the hypothesis is a combination of the first word portion and the second word portion;
         prior to adding the hypothesis to the list of hypotheses, checking if the matching word entry in the lexicon for the second word portion or a last portion of the second portion includes an anti-seg indication as the segmentation information indicating that the associated word cannot be a final component of a compound word; and
         adding the hypothesis to the list of hypotheses only if the entry does not include the anti-seg indication.

2. The method of claim 1 further comprising:
   matching additional portions of the compound word until reaching a final character of the compound word.

3. The method of claim 2 further comprising:
generating a first hypothesis of the component words of the compound word, wherein the first hypothesis is a combination of the matched portions of the compound word.

4. The method of claim 3 further comprising:
generating additional hypotheses of the component words of the compound word.

5. The method of claim 4 further comprising:
ranking each identified hypothesis based on a relative likelihood of being a correct representation of the component words of the compound word.

6. The method of claim 5 wherein ranking is based on data obtained through statistical analysis.

7. The method of claim 4 wherein matching the first word portion comprises matching characters in the compound word starting from a first character of the compound word; and
wherein matching the second word portion comprises matching characters in the compound word starting from a first character that follows a last character of the first word portion.

8. The method of claim 7 wherein if additional matches are found for the first and second word portions in the lexicon, adding these matches as alternative hypotheses to the list of hypotheses.

9. The method of claim 7 comprising:
adding the hypothesis to the list of hypotheses regardless of whether the segmentation information in the matched word entries for the first word portion and the second word portion indicates that associated words in the matched word entries can form a component of a compound word; and
excluding a resulting trace as invalid at a final evaluation of hypotheses if the segmentation information in either matched word entry indicates that the associated word cannot form a component of a compound word.

10. The method of claim 9 wherein if the matched word entry for the second word portion includes an associated word which is a final component in the compound word, further comprising the steps of:
checking if the matched word entry for the final component includes the segmentation information indicating that the associated word can be a final component of a compound word;
adding the hypothesis to the list of hypotheses; and
excluding the resulting trace as invalid at the final evaluation of hypotheses, if the anti-seg bit is present as the segmentation information indicating that the associated word in the word entry matching the final component of the compound word cannot form a final component of the compound word.

11. The method of claim 7 further comprising:
returning to the first portion;
adding a character following the last character in the first portion to the first portion;
repeating the steps of searching, generating, and analyzing;
if additional matching word entries are found for the first and second portions in the lexicon, adding associated words in these matching word entries as alternative hypotheses to the list of hypotheses.

12. The method of claim 7 further comprising:
prior to adding the hypothesis to the list of hypotheses, checking if the matching word entry in the lexicon for the first portion includes segment information indicating that the word associated with the matching word entry can be a component of a compound word; and
adding the hypothesis to the list of hypotheses only if the entry includes the segmentation information.

13. The method of claim 12 wherein if the second portion includes a portion which is a non-final portion, checking if matching word entries for the non-final portion includes the segmentation information; and
adding the hypothesis to the list of hypotheses only if the matching word entries for all non-final segments include the segmentation information.

14. A tangible computer readable medium containing computer executable instructions that, when executed, cause a computer to perform the steps of:
receiving the compound word;
searching a lexicon for entries matching the compound word, the entries including words and associated segmentation indicators indicating whether the associated words can be a component part of a compound word;
identifying component words for the compound word based on the entries contained in the lexicon by matching a first portion of the compound word with a first entry in the lexicon that can be a component of a compound word, as indicated by the associated segmentation indicator; and
matching a second portion of the compound word with a second entry in the lexicon that can be a component of a compound word, as indicated by the associated segmentation indicator; and
if either the first or second portions of the compound word match words in the entries in the lexicon, but the associated segmentation indicator in either of the matched entries indicates that the associated word cannot be a component of a compound word, then searching for a variation of the associated word in the lexicon that has a segmentation indicator indicating the variation can be a component of a compound word.

15. The computer readable medium of claim 14 further comprising instructions to perform the steps of:
matching additional portions of the compound word until reaching a final character of the compound word.

16. The computer readable medium of claim 15 further comprising instructions to perform the steps of:
generating a first hypothesis of the component words of the compound word, wherein the first hypothesis is a combination of the words in the matched entries in the lexicon; and
generating additional hypotheses of the component words of the compound word if additional matched entries are found in the lexicon.

17. The computer readable medium of claim 16 further comprising instructions to perform the steps of:
ranking each identified hypothesis based on a relative likelihood of being a correct representation of the component words of the compound word.

18. The computer readable medium of claim 14 further comprising instructions to perform the steps of:
wherein matching the first portion comprises matching characters in the compound word starting from a first character of the compound word; and
wherein matching the second portion comprises matching characters in the compound word starting from a first character that follows a last character of the first portion.

19. The computer readable medium of claim 18 wherein matching the first portion further comprises instructions to perform the steps of:
searching the lexicon for an entry that matches the first portion;
if a match is found;

analyzing the second portion for matches with entries in the lexicon;
if a match is found for the second portion;
generating a hypothesis in a list of hypotheses, wherein the hypothesis is a combination of the words in the entries matching the first portion and the second portion.

20. The computer readable medium of claim 19 wherein if additional matching entries are found for the first and second portions in the lexicon, adding words associated with these matching entries as alternative hypotheses to the list of hypotheses.

21. The computer readable medium of claim 20 further comprising instructions to perform the steps of:
excluding a resulting hypothesis as invalid at a final evaluation of hypotheses.

22. A method of spell-checking a compound word, comprising:
searching a lexicon for the compound word, the lexicon including entries having a word and an indicator indicating whether the associated word can be a component of a compound word;
if the compound word is not found in the lexicon;
identifying component words comprising the compound word;
comparing each of the identified component words with entries in the lexicon;
determining if each of the component words is correctly used as a component of a compound word based on the indicator in matched entries in the lexicon;
if at least one of the identified component words is used incorrectly, indicating that the compound word includes a spelling error; and
generating a spelling suggestion for the compound word based on the component words;
wherein determining if each component word is correctly used comprises:
if the component word is not the last component word in the compound, checking if the indicator for the entry matching the component word indicates that the word in the matched entry can be a component of a compound word;
if the componenet word cannot be a component of a compound word, applying spelling transition rules to the component word and adding no more than two additional characters to the component word that are not present in the component word to obtain a new component word; and
rechecking if the new component word is in the lexicon with the indicator.

23. The method of claim 22 wherein if applying speller transition rules results in too many unwanted lexical matches, further comprising:
searching the entries in the lexicon for the component word to identify variations of the component word that include the indicator;
generating new compound words that include the identified variations of the component word; and
presenting those new compound words as the spelling suggestion to the user.

24. The method of claim 22 wherein determining if each component word is used correctly comprises:
if the component word is the last component word in the compound, checking if the component word has an anti-seg identifier as the indicator, indicating that it cannot be a last component of a compound word;

if the component word has the anti-segment identifier searching the entries in the lexicon for the component word to identify variations of the component word that do not include the anti-seg identifier; and
if an entry with a variation of the component word does not include the anti-seg identifier, suggesting that variation of the component word as the spelling suggestion for the compound word.

25. The method of claim 22 applying speller transition rules in the compound word includes changing characters comprising the component word.

26. A method for identifying at least two component words in a compound word, comprising:
receiving the compound word;
searching a lexicon for the compound word, the lexicon including word entries that are annotated with associated segmentation information indicative of whether the associated word can form a component of a compound word; and
identifying the component words for the compound word based on the entries contained in the lexicon including the annotated word entries by searching the lexicon for a word entry that matches a first word portion of the compound word;
if a match is found, analyzing a second word portion of the compound word for matches with word entries in the lexicon;
if a match is found for the second word portion, adding a hypothesis, which is a combination of the first word portion and the second word, to a list of hypotheses, regardless of whether the segmentation information in the matched word entries for the first word portion and the second word portion indicates that associated words in the matched word entries can form a component of a compound word; and
excluding a resulting hypothesis as invalid at an evaluation of the hypotheses if the segmentation information in either matched word entry indicates that the associated word cannot form a component of a compound word;
wherein if the matched word entry for the second word portion includes an associated word which is a final component in the compound word, then further comprising the step of:
excluding the hypothesis as invalid at the evaluation of hypotheses, if an anti-seg bit is present as the segmentation information indicating that the associated word in the word entry matching the final component of the compound word cannot form a final component of the compound word.

27. A method of spell-checking a compound word, comprising:
searching a lexicon for the compound word, the lexicon including entries having a word and an indicator indicating whether the associated word can be a component of a compound word;
if the compound word is not found in the lexicon;
identifying component words comprising the compound word;
comparing each of the identified component words with entries in the lexicon;
determining if each of the component words is correctly used as a component of a compound word based on the indicator in matched entries in the lexicon;
if at least one of the identified component words is used incoffectly, indicating that the compound word includes a spelling error;

wherein determining if each component word is correctly used comprises:

if the component word is not the last component word in the compound word, checking if the indicator for the entry matching the component word indicates that the word in the matched entry can be a component of a compound word;

if the component word cannot be a component of a compound word, applying spelling transition rules to the component word to obtain one or more new component words; and rechecking if the new component words match words in the lexicon with the indicator;

wherein if applying speller transition rules results in too many unwanted new component words, then presenting new compound words generated from the new component words as the spelling suggestion to the user only when applying speller transition rules adds, removes, or changes no more than two characters of the component word.

28. A method of spell-checking a compound word, comprising:

searching a lexicon for the compound word, the lexicon including entries having a word and an indicator indicating whether the associated word can be a component of a compound word;

if the compound word is not found in the lexicon;

identifying component words comprising the compound word;

comparing each of the identified component words with entries in the lexicon;

determining if each of the component words is correctly used as a component of a compound word based on the indicator in matched entries in the lexicon;

if at least one of the identified component words is used incorrectly, indicating that the compound word includes a spelling error;

wherein determining if each component word is used correctly comprises:

if the component word is not the last component word in the compound word, checking if the indicator for the entry matching the component word indicates that the word in the matched entry can be a component of a compound word;

if the component word cannot be a component of a compound word, applying speller transition rules to the component word to obtain one or more new component words;

rechecking if the new component words are in the lexicon with the indicator; and generating a spelling suggestion for the compound word based on the new component words;

wherein if applying speller transition rules results in too many unwanted new component words, then further comprising:

searching the entries in the lexicon for the component word to identify variations of the component word that include the indicator;

generating new compound words that include the identified variations of the component word; and presenting those new compound words as the spelling suggestion to the user only if no more than two component words in the compound word require correction.

* * * * *